United States Patent [19]

Shikinami et al.

[11] 4,029,840

[45] June 14, 1977

[54] SYNTHETIC LEATHER

[75] Inventors: Yasuo Shikinami, Shiga; Kosuke Iida, Osaka; Kunihiro Hata, Osaka; Tetsuya Fujii, Osaka, all of Japan

[73] Assignee: Takiron Co., Ltd., Osaka, Japan

[22] Filed: Oct. 1, 1976

[21] Appl. No.: 728,652

[30] Foreign Application Priority Data

Jan. 22, 1976 Japan ............................. 51-6518

[52] U.S. Cl. ........................ 428/310; 204/159.15; 204/159.17; 260/2.5 HA; 428/264; 428/290; 428/904

[51] Int. Cl.² .......................................... B32B 3/26

[58] Field of Search .............. 260/2.5 HA; 428/264, 428/265, 290, 310, 314, 315, 904; 204/159.17, 159.15

[56] References Cited

UNITED STATES PATENTS

| 3,816,284 | 6/1974 | Kagiya et al. ................ 260/2.5 HA |
| 3,891,724 | 6/1975 | Yaeda et al. ................. 260/2.5 HA |
| 3,981,830 | 9/1976 | Takeuchi et al. ............ 260/2.5 HA |

*Primary Examiner*—William J. Van Balen
*Attorney, Agent, or Firm*—Sughrue, Rothwell, Mion, Zinn & Macpeak

[57] ABSTRACT

Synthetic leather comprising cross-linked foamed syndiotactic 1,2-polybutadiene as a main ingredient.

5 Claims, No Drawings

SYNTHETIC LEATHER

BACKGROUND OF THE INVENTION

1. Field of the Invention

The present invention relates to a synthetic leather using, in a synthetic resin layer which is the base material of the synthetic leather, cross-linked foamed syndiotactic 1, 2-polybutadiene. The synthetic leather has favorable softness providing the touch and aesthetic properties of natural leather, undergoes low changes in flexibility within the temperature range of ordinary use, and having good elasticity.

2. Description of the Prior Art

Most synthetic leathers have a multi-layered structure comprising a base fabric layer, an adhesive boundary layer, a resin layer and a top layer. In the resin layer, quasi-natural leathers such as foamed or unfoamed polyvinyl chloride, polyamides, polyurethanes, polyamino acids, etc. are conventionally used. Those which contain a base sheet comprising polyvinyl chloride are generally called vinyl leathers, and the foamed products thereof are called sponge leathers to discriminate them from oridinary synthetic leathers. Vinyl leathers have the practical advantages that they are comparatively inexpensive and can be produced with ease, and they enable one to obtain suitable physical properties for the artificial leather. Therefore, they are currently used in the largest amount neglecting various defects with respect to physical properties, i.e., since polyvinyl chloride is an essentially glassy and hard resin, a large amount of a plasticizer must be compounded therewith in order to convert it to a leather or like soft material. In particular, for high-grade leathers which require good softness through all seasons, dioctyl phthalate, di-n-octyl phthalate, dioctyl sebacate or like plasticizers are mainly compounded therewith. These plasticizers are partly vaporized away during production of the synthetic leather and cause the phenomenon of bleeding, migration, etc., thus being unavoidably released from the base material to come into contact with the human body. Such a release of plasticizer can be the cause of a reduction in flexural fatigue resistance at low temperatures in winter and blocking at high temperatures in summer. Recently, the harmful effects of many plasticizers have been suspected. From this viewpoint, there have been conducted various investigations of the use of foamed products of plasticizer-free high pressure process polyethylene or ethylene-vinyl acetate copolymers containing vinyl acetate in high proportions. However, these are so poor in adhesive properties that adhesion to a base fabric layer or to a top layer is difficult. Further, they are inferior in softness. Thus, they have not yet replaced conventional vinyl leathers.

SUMMARY OF THE INVENTION

It is one object of the present invention to provide a synthetic leather.

A further object of the present invention is to provide a synthetic leather comprising cross-linked, foamed syndiotactic 1,2-polybutadiene as a main component.

A yet further object of this invention is to provide a synthetic leather comprising one or more layers consisting of cross-linked, foamed syndiotactic 1,2-polybutadiene or a mixture of such 1,2-polybutadiene and another synthetic resin as a synthetic resin layer(s).

A still further object of the present invention is to provide such a synthetic leather having favorable softness and providing a feel and aesthetic property similar to that of good natural leather, which undergoes low changes in flexibility at a temperature of ordinary use, and which has good elasticity.

DETAILED DESCRIPTION OF THE INVENTION

Cross-linked syndiotactic 1,2-polybutadiene has none of the aforesaid difficulties of the prior art since it does not contain any plasticizer. In addition, it has extremely excellent softness and a gentle touch, as well as good flexibility, which highly resembles the feel of natural leather obtained by chrome tanning, and is completely different from conventional rubber sheets. Also, it has good adhesive properties, and adhesion to a base fabric or top-coating can be conducted with ease using a properly selected conventional adhesive agent or surface treating agent. In this case, cross-linking imparts a suitable solvent resistance. As an adhesive agent conventional ones belonging to natural rubbers, chloroprene rubbers, nitrile rubbers, butyl rubbers, urethane rubbers or epoxy resins can be used. The surface treating agents used in this invention should be such that they have substantially the same flexibility and elasticity as those of the cross-linked foamed syndiotactic 1,2-polybutadiene and have adhesiveness, with urethanes, especially thermoplastic urethane, surface treating agent providing good results. The adhesive layer may be provided between the surface treating layer and a resin layer. The surface treating layer may also be coated in multi-layer form, if desired. For example, a surface treating agent belonging to polyamino acids, polyamides, polyvinyl chlorides or acrylic rubbers may be coated on the surface layer of a polyurethane in one or more layers to thereby prepare a synthetic leather having desired properties, e.g., various lusters, feel and the like.

There can be also obtained a product with uniform and fine cells, which improve the abrasion resistance and scratch resistance of the surface.

Th syndiotactic 1,2-polybutadiene of the present invention is a resin of excellent heat stability and molding properties, having comparatively high 1,2-bond content (about 70% or more), a comparatively high molecular weight (about 100,000 or more), and a comparatively low degree of crystallinity (about 10 to about 50%), and containing 20% or more of a syndiotactic stereospecific structure. The content of isomeric units (cis-1,4-, trans-1,4-, and 1,2-vinyl units) is determined by IR absorption spectra according to Morero's method (D. Morero, A. Santanbrogio, L. Porri, and F. Ciampelli: Chem. e.Ind., 41, 758 (1959). The method proposed by Mochel is used to estimate the tacticity of 1,2-polybutadiene samples (V. D. Mochel: J. Polym. Sci., Part A-1, 10, 1009 (1972).

In general, 1,2-polybutadiene polymers can be classified into (1) liquid types having a low molecular weight; (2) completely amorphous ones having a rubbery property; (3) highly crystalline ones having poor heat stability and no workablility; and (4) low crystalline ones having a high molecular weight and good workability.

Of these, type (1) requires increased molecular weight and cross-linking upon working, and continuous molding using an extruder or the like is difficult due to the liquid state thereof. Type (2) is so poor in heat fluidity that it is not suitable for processing in a general thermoplastic resin molding machine. With type (3), practical heat molding is difficult since the warking temperature almost coincides with the decomposition point. Type (4) is a thermorubber having a moldability similar to that of thermoplastic resin.

The 1,2-polybutadiene thermoplastic is a solid having an adhesiveness insufficient to form pellets at room temperature and having, at a temperature above its softening point, a melt viscosity sufficient to form using a conventional molding apparatus. In order to make 1,2-polybutadiene a thermoplastic resin, the 1,2-polybutadiene should be a polymer which contains both a crystalline phase and rubber phase at room temperature due to the properties of the monomers used with the content of crystalline phase being lower than that of the rubber phase. For example, when the polymer consists of only the rubber phase it becomes a polymer belonging to type (2) above, and when it consists of a considerably high amount of crystalline phase, it becomes a type (3) polymer. Further, a polymer consisting only of 1,2-unit has not hitherto been obtained other than one having a relatively low molecular weight which is liquid because of difficulties encountered in polymerization. Therefore, in order to obtain a thermoplastic polymer, it is necessary that the resin contain some 1,4-bonds. There is a close inter-relationship between the 1,2-unit content, the stereoregular structure content and crystallinity. That is, in 1,2-polybutadiene which is a thermoplastic rubber, the content of syndiotactic configurations increases with the content of the 1,2-bonds. When the 1,2-bond content is considerably high (not less than about 70mol %) and the syndiotactivity is also relatively high (not less than about 20 mol %), the crystallinity is relatively low (about 10 to about 50 mol %), thus providing a polymer having a molecular weight of not less than about 100,000 which can readily be processed as a thermoplastic rubber. This polymer is a 1,2-polybutadiene polymer employable in this invention.

The 1,2-polybutadiene used in the present invention can be obtained according to methods described in Japanese Patent Publications No. 32425/1969, 32426/1969, 38070/1970, 30699/1971, 30700/1971, etc. For example, a solvent, butadiene and catalyst (e.g., cobalt bisacetylacetonate, triphenylphosphine, triethyl aluminum) are introduced into a glass tube in a proportion of Al/Co/P/butadiene = 430/178 /100,000 (molar ratio) and allowed to react at 10° C for about 18 hours, followed by adding an aging inhibitor and then stopping the reaction to thereby obtain the desired 1,2-polybutadiene. From X-ray diffraction analysis, the vinyl units in the fine structure of the polymer are present in an amount of about 90% or more.

Cross-linked foamed syndiotactic 1,2-polybutadiene product can generally be produced by cross-linking through a chemical cross-linking process using sulfur or an organic peroxide or a physical cross-linking by irradiation with gamma rays, electron beams or the like and then heating to a temperature higher than the decomposition point of a chemical foaming agent to foam the cross-linked product.

As an original sheet for synthetic leather, physical properties and aesthetic properties particularly resembling those of natural leather are required, and hence foamed products obtained by the process and using the materials as described in U.S. Pat. Application Ser. No. 728,653 entitled "Process For Producing Foamed Products," filed Oct. 1, 1976 in the names of Yasuo Shikinami, Ryuichi Kimura, Yoshinobu Yoshikawa, Kosuke Iida and Kunihiro Hata, hereby incorporated by reference, are said to be desirable. That is, a photosensitizer, a foaming agent and, if desired or necessary, an aging inhibitor, a colorant, or like additives are added to the above described 1,2-polybutadiene, and the mixture fed to an extruder or a like molding machine to form the same into a thin sheet at a temperature higher than the softening point of the resin and lower than the decomposition point of the foaming agent, and then the sheet is irradiated with ultraviolet rays for a short time to convert the resin to a resin having a three-dimensional structure (cross-linking), followed by heating to a higher temperature than the decomposition point of the foaming agent to foam and expand the cross-linked sheet, whereby foamed products are continuously obtained. The gel fraction of such products (refluxed for 7 hours in boiling toluene) is suitably about 30 to 80%.

The thus obtained foamed product is of extremely excellent softness, scarcely undergoes changes in flexibility at temperatures of ordinary use, is particularly excellent in elasticity and smoothness, and well absorbs the energy as tensile, bending, deformation, etc. Accordingly, it follows the complicated shape of a coated substrate so accurately that it is particularly suitable as a synthetic leather for clothes. Also, it provides a gentle touch due to the vinyl groups in the side chains of the base resin, and has aesthetic properties extremely closely resembling high quality natural leather. Further, it provides a warm agreeable touch since it is a foamed product. Thus, it has many advantages.

The thickness of the foamed product suitable as a resin layer for synthetic leather is about 0.3 to about 2.0 mm, preferably 0.5 to 1.5 mm (this thickness range applies only to the polybutadiene layer), and the expansion ratio ranges from about 3 to about 15 times (the bulk density being about 0.3 to about 0.05 g/cm$^3$), preferably 5 to 10 times (the bulk density being 0.18 to 0.09 g/cm$^3$), which renders it lighter than conventional sponge leathers.

Adhesion to woven fabrics, knitted fabrics, non-woven fabrics, paper, natural or synthetic resin products, various resin films or like base fabric can be effected according to general processes by properly selecting an adhesive agent and a solvent.

Examples of generally used substrates include staple fiber muslin, calico (unbleached muslin), cotton suede, various synthetic fabrics, tricot, polynosic, and single surface or both surface-raised-up cloths of these materials. Although the thickness of adhesive is not limited, generally used thicknesses are from about 5 to 50 g/m$^2$.

Further, a synthetic leather of better quality can be obtained by applying to a top coat (the top-coat thickness is usually from about 3 to about 50 gm/m$^2$, although such is not limitative) a conventional surface treating agent of excellent scratch resistance, abrasion resistance, solvent resistance, heat resistance, weatherability, cold resistance, etc., such as polyurethane, polyamide, or polyamino acid surface treating agents for synthetic leather; the surface treating agents are not limited to any particular kind.

The thus obtained synthetic leather can be used for various uses such as paper substitutes and linings for use in buildings, cars, etc., book covers, chair covers, tablecloth substitutes, carpets, foot wear such as sandals and slippers, bands for wrist watches and as a belt for clothing, sacks and bags, covers, and the like.

Additionally, in some cases, the cross-linked foamed product prepared by mixing the syndiotactic 1,2-polybutadiene of the present invention with low density polyethylene, an ethylene-vinyl acetate copolymer (desirably the vinyl acetate content is not more than about 40 mol %) or another soft, i.e., flexible polyolefin copolymer having compatibility with the syndiotactic 1,2-polybutadiene, e.g., an ethylene-propylene copolymer, an ethylene-acrylic acid ester copolymer, an ethylene-butadiene copolymer and the like, may be used. The aesthetic properties, softness, weatherability, solvent resistance and like physical properties of the product can be adjusted according to the kind of soft polyolefin and the compounding ratio thereof. Generally such polyolefins are used in an amount of about 10 to about 50% by weight based on the total weight of the product in view of the flexibility, adhesive properties, feel, etc., of the total weight of the 1,2-polybutadiene and the soft polyolefin.

The present invention will be illustrated by several Examples. Unless otherwise indicated all parts and percentages used herein are by weight.

EXAMPLE 1

Pellets, prepared by mixing 100 parts of syndiotactic 1,2-polybutadiene (trade name: JSR, RB-810; made by Japan Synthetic Rubber Co., Ltd.) with 7.0 parts of azodicarbonamide, 1.0 part of p,p'-oxybis(benzenesulfonylhdrazide) and 0.5 part of benzophenone, were fed to an extruder and continuously extruded into a 0.4mm thick sheet. This sheet was then irradiated for 4 minutes with ultraviolet rays at a distance of 30 cm from both sides using 1 KW high pressure mercury lamp, and the foaming agent was decomposed at 210° C to obtain a foamed sheet, followed by passing the sheet between hot rolls (about 50° to about 60° C) to form a sheet having a smooth surface. There was thus obtained a foamed sheet of a specific gravity of 0.1 which was 1.2 mm in thickness having good surface properties and uniform, fine cells which was of extremely excellent flexibility and had aesthetic properties well resembling good natural leather. When this foamed sheet was subjected to the physical tests specified for polyvinyl chloride leather [blocking test (JISK-6772); flexing resistance test (1 kg × 5000 times; Scott's process); cold flexing test (20,000 times at −10° C)], it withstood all the tests.

On the other hand, a chloroprene adhesive was thinly coated (30g/m$^2$) on knitted fabric or non-woven fabric, and the foamed sheet was laminated thereon. Thereafter, an urethane surface treating agent (LU 1500, LU 3500 or LU 3560; made by Dainischiseika Colour and Chemical Mfg. Co., Ltd.) was coated thereon in a thickness of 15 to 30 g/m$^2$ to form different samples, followed by drying. The thus obtained synthetic leather was extremely soft, and the flexibility thereof was hardly effected at temperatures of ordinary use (−20° to 45° C), the leather showing no adhesive properties. When the base fabric was an elastic knitted fabric, the product was so elastic that it could be bent and stretched into complicated shapes.

Foamed sheets of 0.3 to 2.0 mm in thickness and a 3 to 5 times expansion ratio were prepared in the same manner, and the same synthetic leathers obtained by adhering these sheets to base fabric and subjecting them to a surface treatment.

EXAMPLE 2

Syndiotactic, 1,2-polybutadiene (the same as in Example 1) was respectively mixed with 10 to 50% of ethylene-vinyl acetate copolymer (vinyl acetate content: not more than 40%) (trade name: Ultrathene made by Toyo Soda Manufacturing Co., Ltd.) or ethylene-propylene copolymer (melt index according to ASTM D1238: 0.25–9.0; density 0.88) (trade name: Tafmer; made by Mitsui Petrochemical Industries, Ltd.), and foamed products were obtained in the same manner as in Example 1, which were a little different in elasticity, softness and aesthetic properties. However, the same synthetic leathers as in Example 1 were obtained by properly selecting base fabric or a surface-treating agent.

While the invention has been described in detail and with reference to specific embodiments thereof, it will be apparent to one skilled in the art that various changes and modifications can be made therein without department from the spirit and scope thereof.

What is claimed is:

1. Synthetic leather comprising a substrate carrying a resin layer comprising cross-linked, foamed syndiotactic 1,2-polybutadiene.
2. Synthetic leather as claimed in claim 1 in which said resin layer consists only of cross-linked, foamed syndiotactic 1,2-polybutadiene.
3. Synthetic leather as claimed in claim 1, wherein said resin layer comprises 1,2-polybutadiene and another synthetic resin.
4. Synthetic leather as claimed in claim 3, wherein said another synthetic resin is low density polyethylene or an ethylene-vinyl acetate copolymer having not more than about 40 mol % vinyl acetate.
5. Synthetic leather as claimed in claim 4 wherein said another synthetic resin is used in an amount of about 10 to about 50% by weight based on the total weight of the synthetic leather.

* * * * *